(12) United States Patent
Miller et al.

(10) Patent No.: US 7,315,558 B2
(45) Date of Patent: Jan. 1, 2008

(54) DISABLE/ENABLE CONTROL FOR LASER DRIVER EYE SAFETY

(75) Inventors: Frederick W. Miller, San Jose, CA (US); Takashi Hidai, Palo Alto, CA (US); Michael A. Robinson, Fremont, CA (US)

(73) Assignee: Avago Technologies Fiber IP Pte Ltd., Singapore (SG)

( * ) Notice: Subject to any disclaimer, the term of this patent is extended or adjusted under 35 U.S.C. 154(b) by 145 days.

(21) Appl. No.: 11/165,905

(22) Filed: Jun. 24, 2005

(65) Prior Publication Data
US 2006/0020857 A1    Jan. 26, 2006

Related U.S. Application Data

(62) Division of application No. 10/347,000, filed on Jan. 17, 2003, now Pat. No. 7,215,688.

(51) Int. Cl.
*H01S 3/00* (2006.01)

(52) U.S. Cl. .................................. 372/38.09; 372/38.1

(58) Field of Classification Search ............ 372/38.09, 372/38.1, 38.01, 38.02
See application file for complete search history.

(56) References Cited

U.S. PATENT DOCUMENTS

| 5,272,716 | A |   | 12/1993 | Soltz et al. |
| 5,999,549 | A | * | 12/1999 | Freitag et al. ........... 372/38.09 |
| 2003/0002109 | A1 | * | 1/2003 | Hochberg et al. ........... 359/152 |

FOREIGN PATENT DOCUMENTS

| EP | 0441709 | 8/1991 |
| EP | 0486172 | 5/1992 |
| EP | EP1202454 | 5/2002 |
| GB | GB2365236 | 2/2000 |

\* cited by examiner

*Primary Examiner*—Armando Rodriguez

(57) ABSTRACT

A circuit for disabling an energy-generating component. The circuit comprises an input operable to receive a disable signal and a disable circuit operable to disable the component in response to the disable signal for a predetermined duration of time sufficient to maintain an average power generated by the component at or below a predetermined level. The disable circuit further comprises a signal-detection circuit operable to detect the presence of disable signals having a respective rising edge and falling edge, a mask-signal generating circuit coupled to the signal detection circuit and operable to generate a mask signal when one of the edges of a first disable signal is detected; and a latching circuit coupled to the mask-signal generating circuit and operable to generate a mask disable signal if the mask signal is being generated and the other edge of a subsequent disable signal is detected.

5 Claims, 6 Drawing Sheets

DISABLE/ENABLE CONTROL FOR LASER DRIVER EYE SAFETY

This is a Divisional of copending application Ser. No. 10/347,000, filed on Jan. 17, 2003 now U.S. Pat. No. 7,215,688, the entire disclosure of which is incorporated herein by reference.

BACKGROUND OF THE INVENTION

Many of today's fiber optic communication devices use lasers as a light source for digital communication. Additionally, other devices, such as optical mouse input devices or laser pointers also use lasers in their respective operation.

These lasers generate optical signals for digital fiber-optic transmissions and can sometimes generate light powerful enough to damage the human eye. For example, a typical fiber-optic communication device includes a connector for connecting a fiber-optic cable in optical alignment with the laser. Therefore, if a person looks into the end of the optical fiber, then the laser beam may enter his eye. Alternatively, if a person disconnects the cable and looks directly into the connector, the laser beam may also enter his eye. Furthermore, broken or cut fiber-optic cables may also allow a laser beam to inadvertently enter a person's eye.

If the average power of the laser beam is high enough, then the beam may damage a person's retina. Consequently, in situations where the laser beam may enter one's eye, safety is of a concern. As a result, to conform to eye-safety standards fiber-optic communication devices typically include laser fault-detection and disable/enable circuitry.

One example of a fiber-optic communication device with a conventional disable circuit is shown in FIG. 1. A transceiver module 100 includes a receiver 101, a transmitter 102, and a controller/control circuitry 103 and is typically part of a conventional fiber-optic communication system in which the transceiver module 100 is coupled to a host 105. The receiver 101, transmitter 102, and controller 103 are coupled to the host 105 via a communication link 106 and the receiver 101 and transmitter 102 are coupled to the controller 103 via respective communication links 107 and 108. The operation of a conventional transceiver module such as module 100 is known in the art and is described in greater detail in U.S. patent application Ser. No. 10/327,216 filed on Dec. 20, 2002, and which is assigned to Agilent Technologies of Palo Alto, Calif.

The transmitter 102 includes at least one laser driver 105 coupled to a laser 120 and a disable circuit 110. The transmitter 102 further includes fault-detection circuitry 130 for detecting faults in the transmitter 102. Upon detection of a fault, the fault-detection circuitry 130 sends a signal via fault flag signal line 150 for disabling the laser driver 106, and sends a fault signal on a fault signal line 151 to the host 105. By convention, the host 105 typically generates a disable signal on a disable line 152 to the disable circuit 110 which is, in turn, coupled to the laser driver 106. The disable circuit 110 generates a shutdown signal on a shutdown-signal line 153 that also disables the laser driver 105 and, thus, the laser 120 cannot be turned on. The disable circuit 110 generates the shutdown signal for a number of reasons, including safe laser power levels being exceeded and a disable signal from the host 105.

A problem arises, however, in specific situations when the disable line 152 to the disable circuit 110 is cycled (repetitive alternating signals) at a speed close to the fault response time (described below) of the fault detection circuitry 130. In particular, when an unrecoverable fault in the transmitter 102 has occurred, a typical host 105 will cycle the disable signal on the disable line 152 to the faulted transceiver module 100 to reset the module to its default power-up state or some other initial state. Thus, it is possible for a transceiver module 100 to get into a state where the laser is turned on and off repeatedly. For example, fault detection circuitry 130 in the transceiver module 100 may detect a fault situation, such as the laser 120 is operating at an excessive power level, and, as a result, send a fault signal to the host 105. The host 105, in response to the fault signal sends a disable signal back to the transceiver module 100, which in turn causes the disable circuit to generate a shutdown signal to disable the laser 120 and reset the fault detection circuitry 130. The host 105 then attempts to restart the transmitter 102 by sending a re-enable signal to the transmitter 102 through the disable line 152. Upon receiving the re-enable signal, the disable circuit 110 terminates the shutdown signal, and the laser 120 will turn back on again. If there is still a fault present, the laser 120 is turned off once again because the fault detection circuitry 130 still detects a fault. This is a common method used to clear a transmitter fault that may be transient and recoverable. Thus, if the fault is not recoverable and this re-enable/disable cycle is repeated at a speed close to the fault response time, the total average power transmitted by the laser may still exceed eye-safe power levels. This phenomenon is further discussed below in conjunction with FIG. 2.

FIG. 2 is a timing diagram of signals in the transceiver module 100 of FIG. 1 in the above-described situation when a conventional disable circuit allows a laser to exceed eye-safe power levels.

During a period 210 of normal operation, i.e., a fault 201 condition is not present, the laser operating power 204 (LOP) has a normal average power 211, which meets eye-safety standards.

When a recoverable fault 220 occurs, the fault detection circuitry 130 (FIG. 1) detects the fault 220, shuts off the laser by generating a laser off signal 203, and sets a fault flag 205 at point 224 that the host 105 (FIG. 1) reads either on a polling or an interrupt basis. A finite amount of time exists between the occurrence of the fault 220 and the assertion of the fault flag 205 and laser off 203 signals which is called the fault response time 250. In response to the fault flag 205, the host 105 asserts a disable signal 202 (shown as active high) at point 221 which is some time after the assertion of the fault flag signal 205. Typically, the laser will have an LOP 204 that is an excessively high value 251 during the fault response time 250 because a fault 201 has occurred and the laser off signal 203 has not been asserted yet. During this time, the laser 120 is still generating a higher level 251 of average power than allowed, although not for a time period long enough to cause damage to one's eye. The disable signal 202 clears the fault flag signal 205 at point 226 but still prevents the laser 120 from being turned back on as long as the disable signal 202 is asserted. While the laser 120 is off, the LOP 204 is zero as shown at 223. Typically, the host 105 keeps the disable signal 202 active for a predetermined time that is deemed sufficient for the fault 220 to be corrected. Then, in response to the deassertion of the disable signal 202, the laser off signal 203 is deasserted at point 227, which will allow the laser 120 to be turned back on for normal operation. If the fault is corrected, then the transceiver module 100 continues to operate normally such that the LOP 204 has an average-power level that is less than or equal to the maximum eye-safe level.

The problematic situation described above occurs when an unrecoverable fault 230 occurs. In some instances, the unrecoverable fault 230 cannot be corrected through automatic means (cycling the disable line 152 or power), and thus, may hold the average power level of the LOP 204 to an unsafe level 240. As in a normal situation, the unrecoverable fault 230 is detected by the detection circuitry 130, the fault flag 205 is set at point 235 after the fault response time 250 which causes the laser-off signal 203 to be asserted, also at point 235, thereby turning off the laser. In response to the fault flag 205, the host 105 asserts a disable signal 202 at point 231 to clear the fault flag 205. After the given amount of time determined by the host 105, the disable signal is deasserted at point 238, which in turn, allows the laser-off signal 203 to deassert. Different from the normal situation, however, the unrecoverable fault 230 has not cleared and the LOP 204 may go to a maximum (non-eye-safe) value at point 233 after the laser-off signal 203 is deasserted but before the fault flag 205 is set again. The fault detection circuitry 130 will detect the fault 230 again and assert the fault flag 205 and laser off 203 signals at point 240, but the LOP 204 will remain at maximum power during the fault response time 250 and the process could repeat indefinitely. Thus, the overall average-power level 240 in the unrecoverable fault 230 situation can exceed the maximum eye-safe threshold if the duty cycle of the laser is large enough.

One solution to this problem is to count the number of assertions of the disable signal 202 within a predetermined time period and to permanently disable the laser 120 if the number of assertions is greater than a predetermined threshold. For example, one could set the controller 103 to permanently (until the module 100 is reset from an external source, typically by a power cycle) disable the laser 120 if the disable signal 202 is asserted more than 3 times within a 50 millisecond period.

A problem with this solution, however, is that once the disable assertion threshold is exceeded, the transceiver module 100 requires a power cycle to be enabled again. That is, the module 100 must be turned off and then on again to clear the fault.

SUMMARY OF THE INVENTION

A disable circuit for disabling an energy-generating component is presented. In accordance with an embodiment of the invention, the circuit comprises an input operable to receive a disable signal and a disable circuit operable to disable the component in response to the disable signal for a predetermined duration of time sufficient to maintain an average power generated by the component at or below a predetermined level The disable circuit further comprises a signal-detection circuit operable to detect the presence of disable signals having a respective rising edge and falling edge, a mask-signal generating circuit coupled to the signal detection circuit and operable to generate a mask signal when one of the edges of a first disable signal is detected; and a latching circuit coupled to the mask-signal generating circuit and operable to generate a mask disable signal if the mask signal is being generated and the other edge of a subsequent disable signal is detected.

A laser driver coupled to a disable circuit according to this embodiment of the invention will be prevented from recycling power to the laser in such a manner so as to cause unsafe levels of laser power. The disable circuit is operable to generate a mask disable signal that detects a repetitious disable signal and upon the second initiation of the disable signal, a mask disable signal is generated that prevents the laser driver from engaging the laser for a predetermined duration of time.

A disable circuit according to another embodiment of the invention may be used in a plurality of other applications wherein an energy generating component is disabled in response to a disable signal, such as, for example, optical pointing devices and laser pointing devices.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The following discussion is presented to enable a person skilled in the art to make and use the invention. The general principles described herein may be applied to embodiments and applications other than those detailed below without departing from the spirit and scope of the present invention. The present invention is not intended to be limited to the embodiments shown, but is to be accorded the widest scope consistent with the principles and features disclosed or suggested herein.

Figure 1:
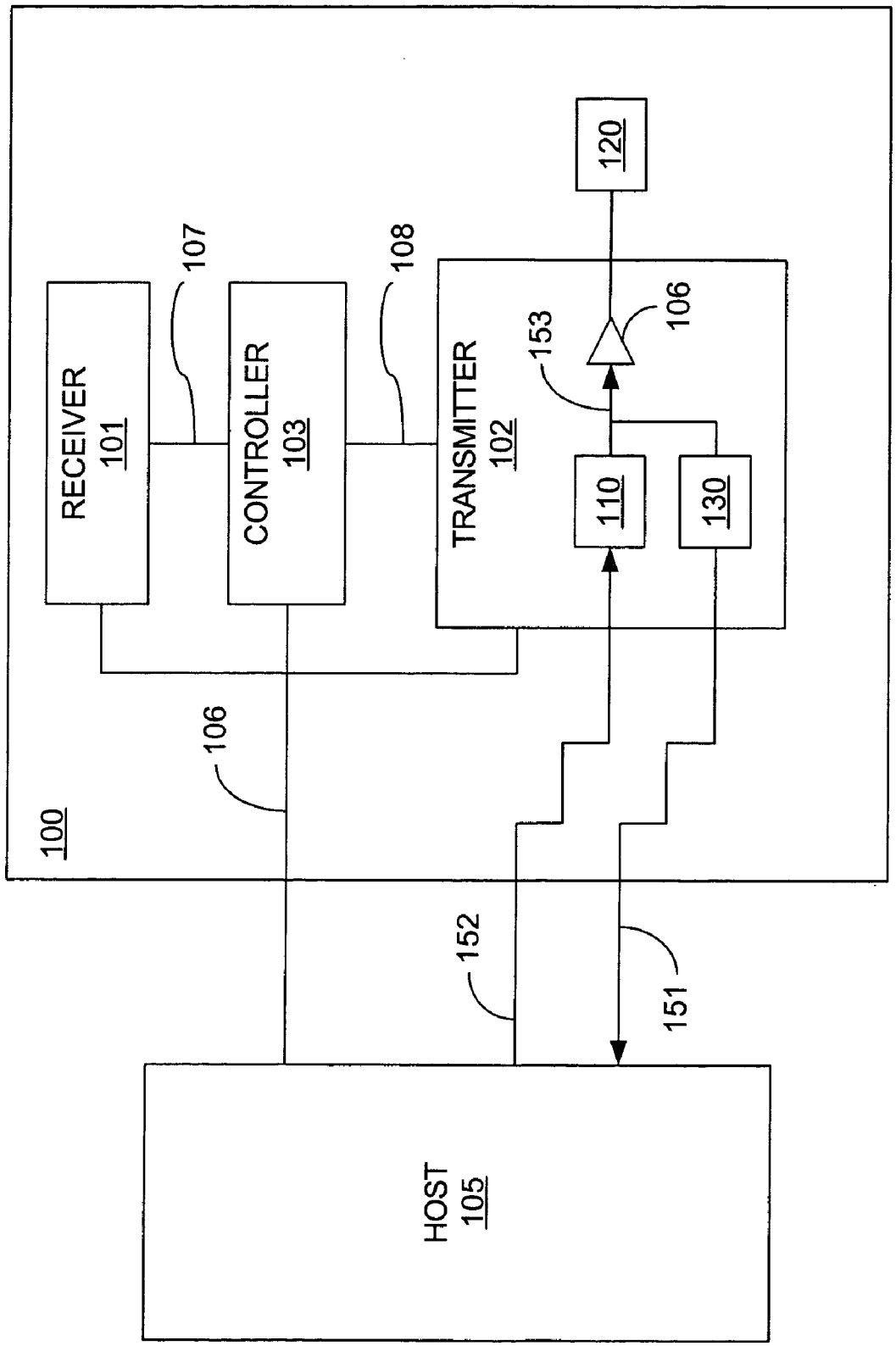
FIG. 1 is a block diagram of conventional fiber-optic transceiver.
Figure 2:
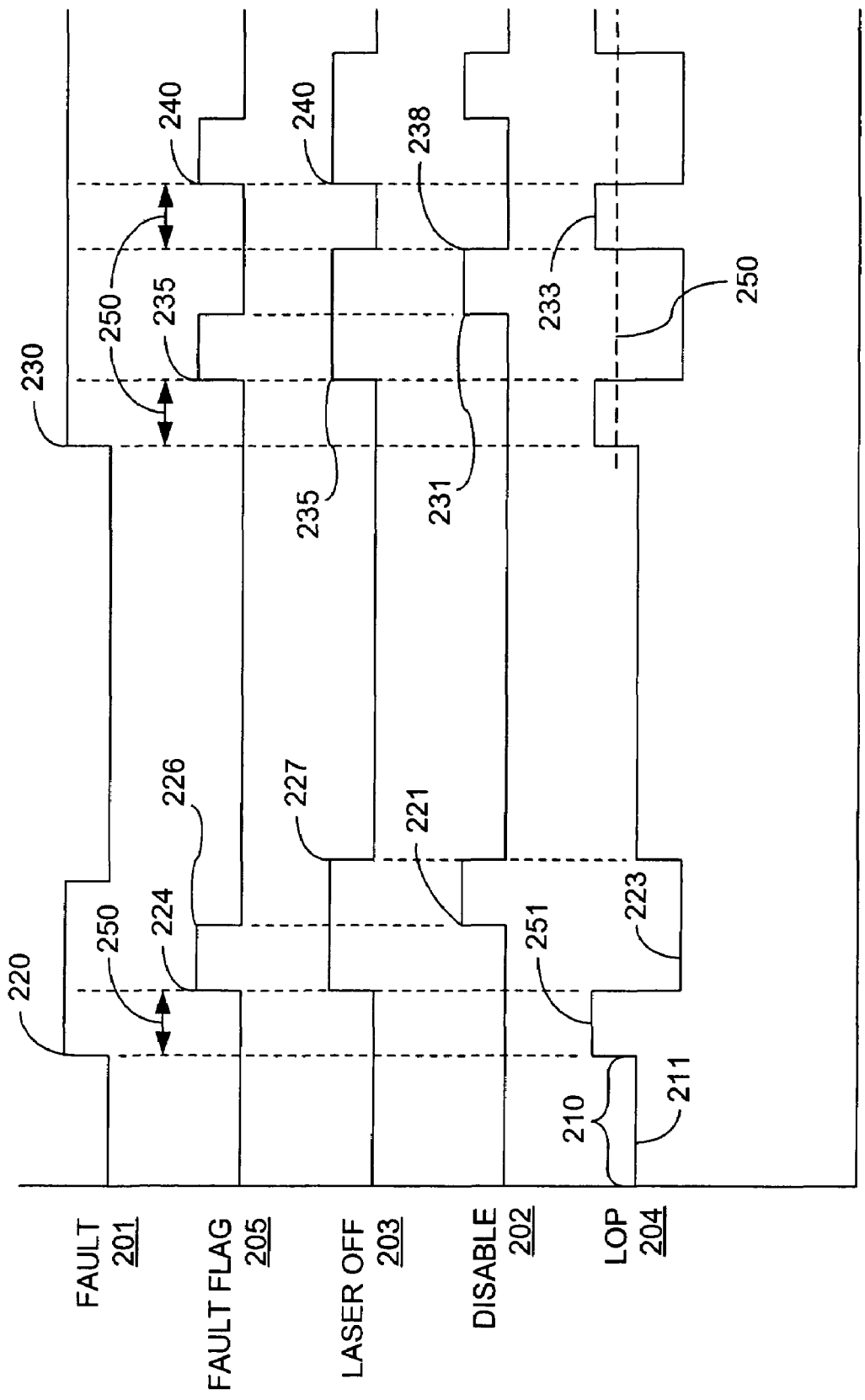
FIG. 2 is timing diagram of signals associated with the fiber-optic transceiver of FIG. 1.
Figure 3:
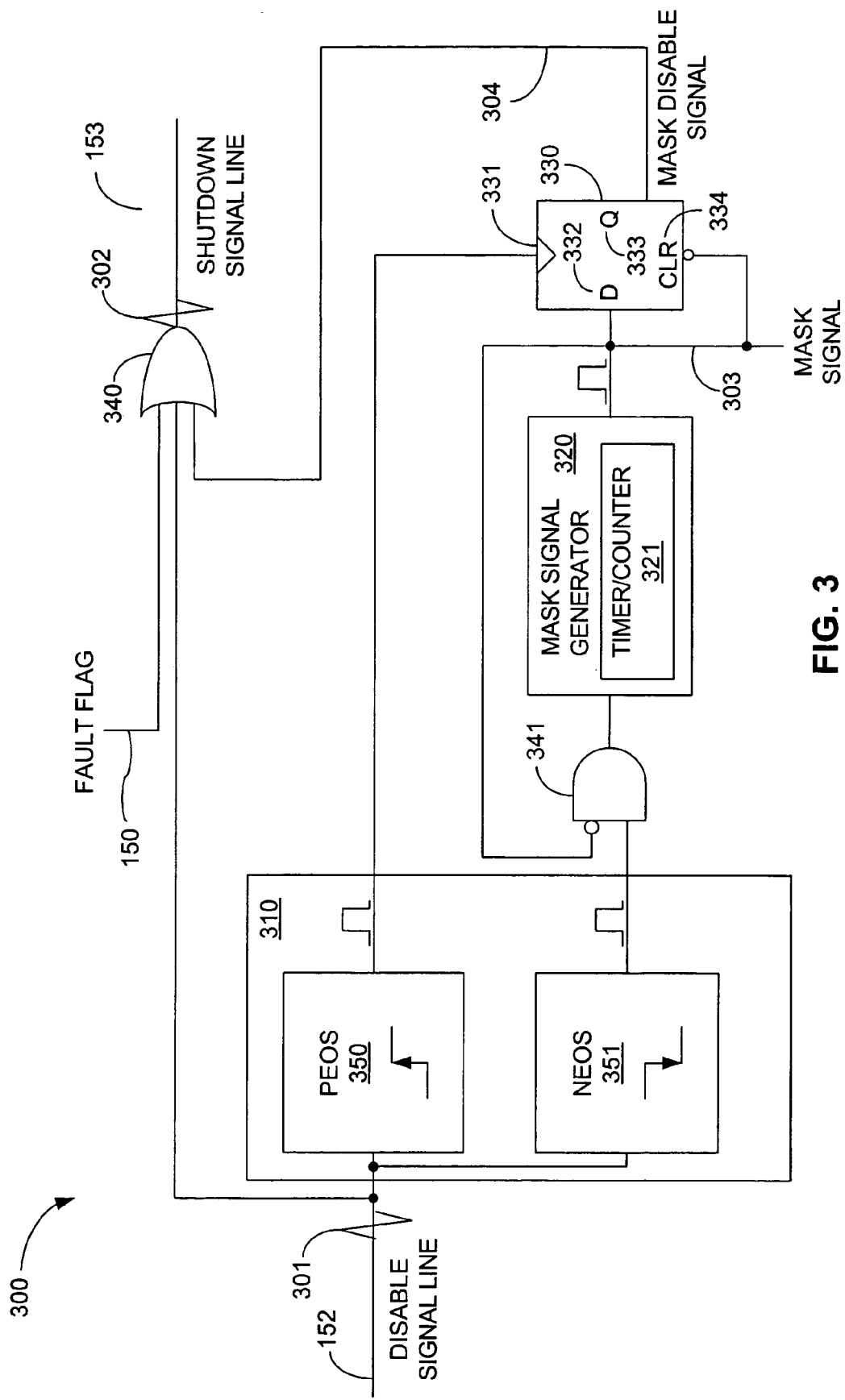
FIG. 3 is a schematic diagram of a laser disable circuit according to an embodiment of the invention.

FIG. 3 is a schematic diagram of a disable circuit 300 for disabling a laser driver in a fiber-optic communication device (not shown) according to an embodiment of the invention. For consistency, like elements with respect to FIG. 1 are labeled with like numbers. The circuit 300 may be included within a fiber-optic transceiver that is otherwise similar to the transceiver of FIG. 1. The disable circuit 300 includes a signal-detection circuit 310 operable to detect a disable signal 301 on a disable line 152, a mask-signal generator 320 operable to generate a mask signal 303 when the disable signal is detected, a flip-flop 330 operable to generate a mask-disable signal 304 in response to the mask signal 303, and an OR gate 340 operable to generate a shutdown signal 302 for the duration of the mask-disable signal 304. A more detailed description of each of these elements is presented below as is a description of the operation of the circuit 300 with the timing diagrams of FIGS. 4A and 4B. The functionality of this circuit can also be implemented by numerous different circuit implementations.

A typical fiber-optic communication device has fault detection circuitry 130 (FIG. 1) that will assert a fault flag signal and shut off the laser when a fault is detected as discussed above in conjunction with FIG. 1. The fault detection circuitry 130 is coupled to a number of monitoring and performance circuits (not shown) within the fiber-optic communication device. The monitoring and performance circuits, in conjunction with the fault detection circuitry, are designed to generate the fault signal on the fault line 151 in which the host 105 responds by generating a disable signal on the disable line 152. (See discussion above regarding FIG. 1). Thus, a disable signal can be generated when the host responds to specific events occurring such as monitored thresholds being exceeded. The disable circuit 300 is designed to generate a shutdown signal that will disable a laser driver (not shown) from turning on a laser (not shown) at any time that the disable signal is at an asserted (here high) value. Thus, as can be seen in FIG. 3, the disable signal 301 is coupled to an input of an OR gate 340, the output of which is a shutdown signal 302 on the shutdown signal line 153. The fault flag signal 205 from the fault flag signal line 150 of FIG. 1 is also an input to the OR gate 340, thus, the assertion of a signal on the fault flag signal line 150 will also generate a shutdown signal 302 on the shutdown signal line 153. As with conventional disable circuits, the shutdown signal 302 will always be at an asserted logic level whenever the disable signal 301 is at an asserted logic level. However, because the OR gate 340 receives input (a mask disable signal 304 described below) from another portion of the disable circuit 300, the shutdown signal 302 will not always be at a deasserted logic level when the disable signal 301 is at a deasserted logic level.

The mask disable signal 304 is used to hold the shutdown signal 302 at an asserted logic level for a predetermined duration of time in unrecoverable fault situations where a repetitive cycling of the shutdown signal 302 may cause unsafe laser power operating levels. By holding the shutdown signal 302 at an asserted logic level, the circuit 300 continues to disable the laser (such as the laser 120 of FIG. 1) even after the disable signal 301 is deasserted.

Still referring to FIG. 3, the signal-detection circuit 310 includes a positive-edge one-shot (PEOS) component 350 and a negative-edge one-shot (NEOS) component 351. The PEOS 350 includes an input coupled to the disable line 152 and an output coupled to the clock input 331 of the flip-flop 330. The PEOS 350 generates a high logic-level one-shot pulse when the disable signal is asserted, i.e., transitions from a low logic level to high logic level. Likewise, the NEOS 351 also includes an input coupled to the disable line 301 and an output coupled to an AND gate 340 (described below) which is coupled to the mask-signal generator 320. The NEOS 351 generates a high logic level one shot pulse when the disable signal is deasserted, i.e., transitions from a high logic level to a low logic level. The PEOS signal and the NEOS signal are used to generate the mask signal 303.

The mask-signal generator 320 receives the output of an AND gate 341 and generates the mask signal 303. The AND gate 341 includes two inputs; one input coupled to the output of the NEOS 351 and the other input, which is inverted, coupled to receive the mask signal 303. When the mask-signal generator 320 detects a rising edge of a high logic level at its input (when the NEOS 351 detects a falling edge of the disable signal 301 and the mask signal 303 is deasserted, and thus, at a low logic level), the mask-signal generator 320 asserts the mask signal 303 for a predetermined duration of time. While the mask signal 303 is at a high level, the inverted input at the AND gate 341 will prevent subsequent mask signals 303 from being generated during the predetermined duration of time that the first mask signal 303 is being generated. Typically, the mask-signal generator 320 includes a counter or timer circuit 321 and the duration of time that the mask signal 303 is generated is sufficient to keep the duty cycle of the laser 120 low enough to insure that the average LOP is within a safe range. In one embodiment, this duration of time is 800 microseconds, but can be any length needed to account for different fault response times in different systems.

Still referring to FIG. 3, A D flip-flop 330 is used to latch the mask signal 303. The flip-flop 330 includes a clock input 331 that is coupled to the PEOS 350, an input 332 that receives the mask signal 303, an output 333 that provides the mask disable signal 304 to another input of the OR gate 340, and a clear input 334 that also receives the mask signal 303. When the mask signal 303 is asserted, a high logic level is present on the input 332 and on the clear input 334. When a rising edge is detected at the clock input 331, the flip-flop 330 is designed to set the output 333 logic level to that of the input level 332. In operation, when a disable signal 301 is first detected at the PEOS 350 and NEOS 351, a mask signal 303 is generated by the mask-signal generator 330 as described above. The mask disable signal 304 is not generated until the disable signal 301 goes to an asserted-logic level for a second time. The second disable signal 301 (the first one after the mask signal 303 has been generated) causes the PEOS 350 to generate a high logic level pulse which is detected at the clock input 331 of the flip-flop 330. In response to receiving a high logic level pulse on the clock input 331, the flip-flop 330 then sets the output 333 to the same logic level as the input 332 (the mask signal 303) which is already at high logic level as a result of the first disable signal 301. Thus, since recoverable faults typically do not generate a second disable signal 301, the mask disable signal 304 typically will not be generated for recoverable faults. This will become clearer when discussed in conjunction with the timing diagram of FIGS. 4A and 4B.

Figure 4A:
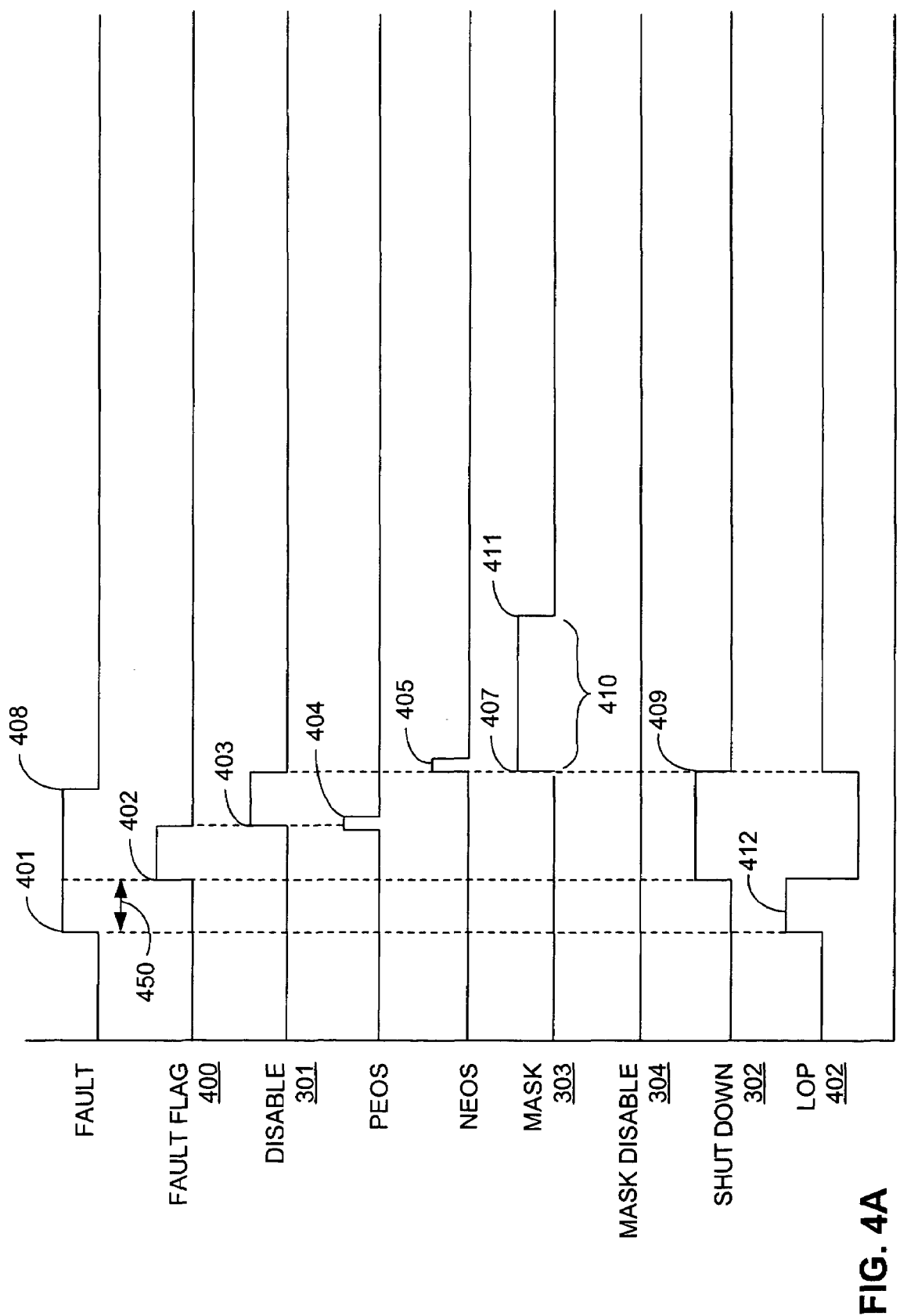
FIG. 4A is a timing diagram of signals associated with the disable circuit of FIG. 3 in a recoverable fault situation according to an embodiment of the invention.
Figure 4B:
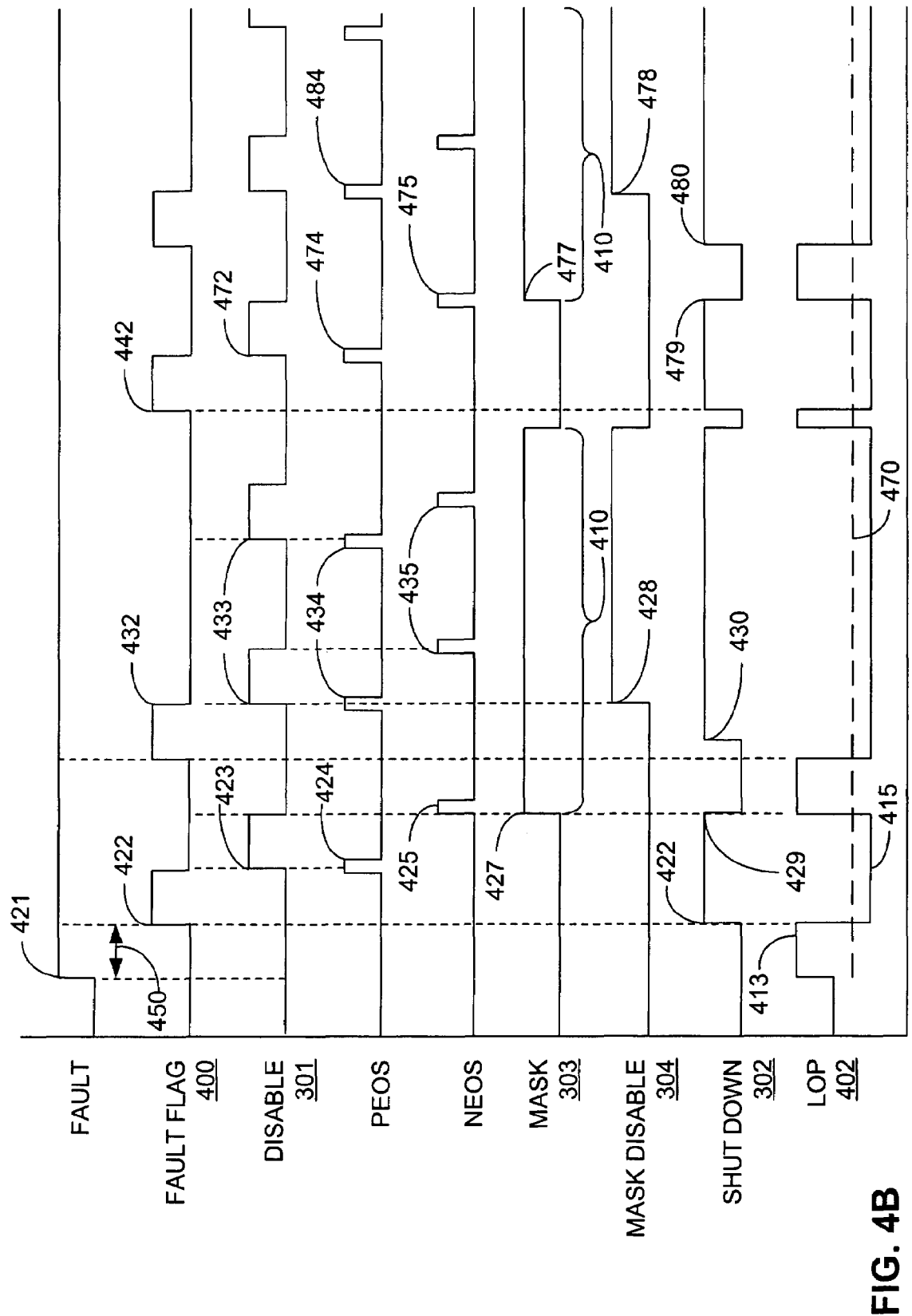
FIG. 4B is a timing diagram of signals associated with the disable circuit of FIG. 3 in an unrecoverable fault situation according to an embodiment of the invention.

FIGS. 4A and 4B are timing diagrams of signals associated with the disable circuit 300 of FIG. 3 according to an embodiment of the invention. The timing diagrams show two situations: a recoverable fault (FIG. 4A) and an unrecoverable fault (FIG. 4B).

Referring to FIG. 4A, in the first situation, a recoverable fault 401 occurs causing the fault flag signal 400 to go to an asserted-logic level at 402 after the fault response time 450. The fault flag signal 400 causes the shutdown signal 302 to be asserted at that time. Because the shutdown signal 302 takes a finite amount of time, i.e., fault response time 450, before disabling the laser driver, the LOP 402 will rise to a high level at point 412 during the fault response time 450. Some time later at point 403, the host 105 will generate a disable signal 301 in response to the fault flag signal 400. The disable signal 301 generates a PEOS pulse 404 on the rising edge and a NEOS pulse 405 on the falling edge of the disable signal 301. The NEOS pulse 405 causes the mask-signal generator 320 (FIG. 3) to generate a high logic level mask signal 303 at point 407 because the output of the AND gate 341 (FIG. 3) is at a high logic level when the NEOS 405 is at a high logic level and the mask signal 407 is a low logic level prior to a first disable signal 301. Because, the fault 401 is recoverable and thus, clears at point 408, no further disable signals 301 are generated and, thus, no further PEOS pulses 404 or NEOS pulses 405 are generated. As such, the mask disable signal 304 remains at low logic level because the flip-flop 330 (FIG. 3) never receives a rising edge of the PEOS pulse 404 on its clock input 331 while the mask signal 303 is at an asserted logic level. Thus, the shutdown signal 302 goes to a low logic level at the same time that the disable signal 301 does at point 409, and after the predetermined duration of time 410, the mask signal 303 falls to a low logic level at point 411.

Referring to FIG. 4B, in the second situation, an unrecoverable fault 421 occurs causing the fault flag signal 400 to go to an asserted level at point 422. Again because the fault flag signal 400 takes a finite amount of time (fault response time 450) before disabling the laser driver, the LOP 402 will rise to a high level at point 413 during the fault response time 450. Again, because of the OR gate 340 (FIG. 3) the shutdown signal 302 is also at a high logic level when the fault flag signal 400 is at a high logic level, thus, the shutdown signal 302 is asserted at point 422 as well which turns off the laser and the LOP 402 falls to a zero level at point 415. Some time later at time period 423, the host 105 will generate a disable signal 301 in response to the fault flag signal 400. The disable signal 301 generates a PEOS pulse 424 on the rising edge (which clears the fault flag signal 400) and a NEOS pulse 425 on the falling edge of the disable signal 301. Again, the NEOS pulse 425 causes the mask-signal generator 320 (FIG. 3) to generate a high logic level mask signal 303 at point 427 for a predetermined duration of time 410. In a situation with an unrecoverable fault 421, additional iterations 433 of disable signals 301 are generated and, thus, additional PEOS pulses 434 and NEOS pulses 435 are also generated. As such, the mask disable signal 304 goes to high logic level at 428 because the flip-flop 330 (FIG. 3) receives a rising edge of the PEOS pulse 434 on its clock input 331 while the mask signal 303 is at an asserted logic level. Thus, the shutdown signal 302 goes to a low logic level at the same time that the disable signal 301 on the first interval at point 429, but then rises to an asserted logic level at the next rising edge of the fault flag signal 400 at point 430 and remains at an asserted logic level until after the predetermined duration of time 410 has expired.

If the fault 421 has not been cleared after the expiration of the predetermined duration of time 410, the process will repeat again so as to keep the duty cycle of the LOP 402 low. Thus, the unrecoverable fault 421 remains and the fault flag signal 400 goes to an asserted level at point 442, which then causes the disable signal 301 to go to an asserted-logic level at point 472. Again, because of the OR gate 340 (FIG. 3), the shutdown signal 302 is set to a high logic level at point 442 when the fault flag 400 is at an asserted level. The disable signal 301 generates a PEOS pulse 474 (which clears the fault flag 400) on the rising edge and a NEOS pulse 475 on the falling edge of the disable signal 301. Again, the NEOS pulse 475 causes the mask-signal generator 320 (FIG. 3) to generate a high logic level mask signal 303 at 477 for the predetermined duration of time 410. As such, the mask disable signal 304 goes to high logic level at 478 because the flip-flop 330 (FIG. 3) receives a rising edge of the PEOS pulse 484 on its clock input 331 while the mask signal 303 is at an asserted logic level. Thus, the shutdown signal 302 goes to a low logic level at the same time that the disable signal 301 at point 479, but then rises to an asserted logic level at the rising edge of the fault flag signal 400 at point 480 and remains at an asserted logic level until after the predetermined duration of time 410 has expired.

This cycle repeats until the unrecoverable fault 421 is cleared either through an automatic means or by an external source. As a result of the cycle, the duty cycle of the laser 120 is reduced and the average power level 470 of the LOP 402 is at or below the threshold for safe operation level. Once the unrecoverable fault 421 has cleared, the LOP 402 begins operating normally after the expiration of the most recent mask disable signal 304.

Figure 5:
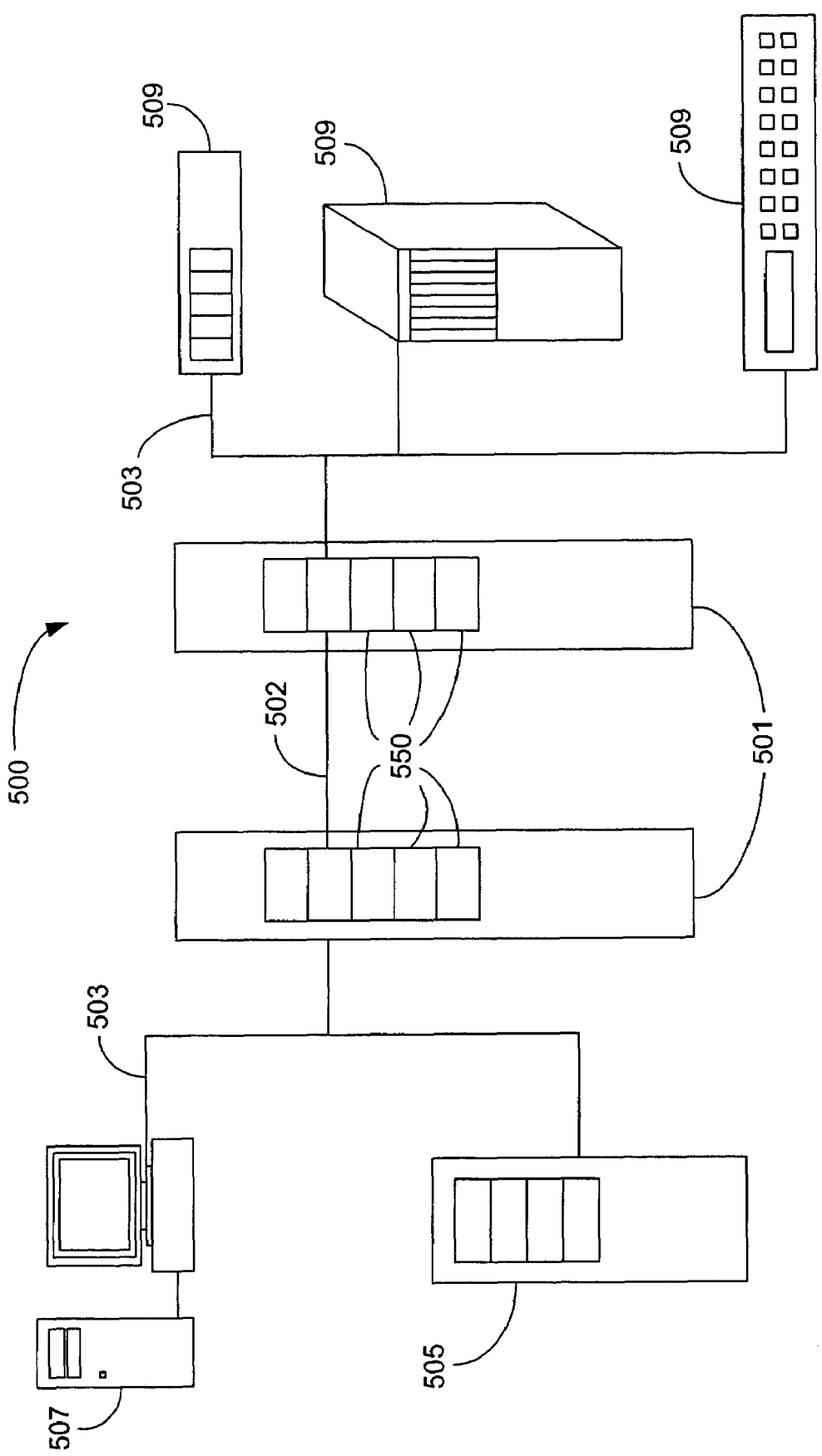
FIG. 5 is a block diagram of a fiber-optic communication system that incorporates the disable circuit of FIG. 3 according to an embodiment of the invention.

FIG. 5 is a block diagram of a digital communication system 500 that incorporates several fiber-optic modules 550, at least one of which includes the disable circuit 300 of FIG. 3 in accordance with an embodiment of the invention. The system 500 comprises devices operable to communicate digitally with each other. Such devices include high-volume database computers 505, server computers 507, and network devices 509 (e.g. hubs, routers, switches). A conventional TX/RX link 503 couples the devices to a communication hub 501 that is operable to house several fiber-optic modules 550.

In this application, a module 550 comprises one or more channels for receiving or transmitting data via a fiber-optic network. Each transmit channel of each module 550 may have a dedicated disable circuit 300 or a set of transmit channels may have a single disable circuit 300 that will disable all transmit channels when a shutdown signal is generated. The module 550 can then communicate with other modules through a fiber-optic communication link 502. As such, devices such as high-volume database computers 505, server computers 507, and network devices 509 (e.g. hubs, routers, switches) can communicate efficiently and effectively using the multichannel capabilities of the fiber-optic module 500.

We claim:

1. A transmitter comprising:
   a fault detection circuit operable to generate disable signals if a fault is detected, each disable signal having a respective rising edge and a falling edge;
   a disable circuit operable to generate a mask disable signal and to disable the component in response to the disable signals for a predetermined duration of time sufficient to maintain an average power generated by the component at or below a predetermined level; the disable circuit comprising a signal detection circuit operable to detect disable signals, a mask-signal generating circuit coupled to the signal detection circuit and operable to generate a mask signal when one of the edges of a first disable signal is detected, and a latching circuit coupled to the mask-signal generating circuit and operable to generate a mask disable signal if the mask signal is being generated and the other edge of a subsequent disable signal is detected; and
   a light emitting source driver operable to drive a light emitting source for fiber-optic communications, the light emitting source driver disabled if a disable signal is generated and disabled if a mask disable signal is generated.

2. A fiber-optic communication system comprising:
   a first module comprising:
      a first fault detection circuit operable to detect a first fault in a first light emitting source driver and generate a first disable signal; and
      a first disable circuit operable to disable a first component in the first light emitting source driver in response to the first disable signal for a predetermined duration of time sufficient to maintain a first average power generated by the first component at or below a first predetermined level; a second module comprising:
      a second fault detection circuit operable to detect a second fault in a second light emitting source driver and generate a second disable signal; and
      a second disable circuit operable to disable a second component in the second light emitting source driver in response to the second disable signal for a predetermined duration of time sufficient to maintain a second average power generated by the second component at or below a second predetermined level;

a fiber-optic communication link coupling the first module to the second module; and a first communication device coupled to the first module and a second communication device coupled to the second module, the communication devices being operable to communicate with one other through the respective modules corresponding thereto.

3. A method, comprising:

detecting a fault;

generating, in response to detection of the fault, a first disable signal;

generating, in response to the first disable signal being generated and the fault persisting, a second subsequent disable signal;

disabling, upon generation of the second disable signal, a component from generating electromagnetic energy for a predetermined duration of time sufficient to maintain an average power generated by the component at or below a predetermined level;

wherein detecting the fault comprises detecting a first edge of the first disable signal and a second edge of the second disable signal, the first and second disable signals being generated in response to detection of the fault.

4. A method, comprising:

detecting a fault; and disabling a component from generating electromagnetic energy for a predetermined duration of time sufficient to maintain an average power generated by the component at or below a predetermined level;

wherein disabling the component comprises:

generating a mask signal for the predetermined duration of time in response to detecting an edge of a disable signal;

detecting an edge of a subsequent disable signal;

generating a mask disable signal for the predetermined duration of time in response to detecting the edge of the subsequent disable signal; and disabling the component in response to the mask disable signal for the predetermined duration of time.

5. The method of claim 4, further comprising not generating the mask signal and not generating the mask disable signal for a predetermined amount of time in response to an initialization signal.

* * * * *